United States Patent [19]

Sawada et al.

[11] Patent Number: 5,669,965
[45] Date of Patent: Sep. 23, 1997

[54] HOT MELT INK

[75] Inventors: Hidemasa Sawada, Gifu; Jun Sakai, Nagoya, both of Japan

[73] Assignee: Brother Kogyo Kabushiki Kaisha, Nagoya, Japan

[21] Appl. No.: 630,090

[22] Filed: Apr. 9, 1996

[30] Foreign Application Priority Data

Apr. 12, 1995 [JP] Japan .................................. 7-086773

[51] Int. Cl.$^6$ .................................................. C09D 11/12
[52] U.S. Cl. ................... 106/31 R; 106/22 A; 106/22 B; 106/20 A; 106/30 A
[58] Field of Search ........................ 106/31 R, 22 A, 106/23 A, 30 A, 22 B, 20 A

[56] References Cited

U.S. PATENT DOCUMENTS

| | | | |
|---|---|---|---|
| 4,390,369 | 6/1983 | Merritt et al. | 106/31 R |
| 4,659,383 | 4/1987 | Lin et al. | 106/27 R |
| 4,684,956 | 8/1987 | Ball | 106/22 A |
| 4,758,276 | 7/1988 | Lin et al. | 106/31 R |
| 4,835,208 | 5/1989 | Ball | 106/31 R |
| 5,350,446 | 9/1994 | Lin et al. | 106/27 R |
| 5,397,388 | 3/1995 | Fujioka | 106/22 A |

FOREIGN PATENT DOCUMENTS

A-5-125316  5/1993  Japan .

*Primary Examiner*—Helene Klemanski
*Attorney, Agent, or Firm*—Oliff & Berridge

[57] ABSTRACT

A hot melt ink includes at least one wax substance having a melting point at a temperature ranging from 50° C. to 150° C. and a coloring agent substantially free of insoluble ingredients not soluble in the at least one wax substance. By removing insoluble ingredients from the coloring agent, for example by filtration, a hot melt ink is obtained that does not clog the printing head.

20 Claims, No Drawings

HOT MELT INK

BACKGROUND OF THE INVENTION

1. Field of the Invention

The present invention concerns a hot melt ink used for a printer device and, more specifically, it relates to a hot melt ink used for a printer device, which is present as a solid at room temperatures and used after being thermally melted at a temperature higher than room temperatures upon conducting printing.

2. Description of Related Art

Heretofore, ink jet printers have many advantages in printing techniques, such as noiselessness, high speed, high quality and the capability of coloration. However, since ink droplets jetted out of a nozzle are directly deposited onto recording paper to conduct recording, print quality and print drying time are affected depending on the type of recording paper. Thus, considerable deterioration in the print quality may be realized if recording is conducted on low-quality paper.

It has been known as means for overcoming such drawbacks to use a hot melt ink having a melting point higher than room temperature, thereby enabling printing of a uniform dot size irrespective of the kind of recording paper. Further, there have been proposed ink compositions using dye as a coloring material to be used for this purpose, including an ink containing natural wax as disclosed in U.S. Pat. No. 4,390,369 (Japanese Laid-open Patent Publication No. Sho-58-108271), an ink containing stearic acid as disclosed in U.S. Pat. No. 4,758,276 (Japanese Laid-open Patent Publication No. Sho-59-22973) and an ink containing C20 to C24 acid or alcohol and C14 to C19 acid or alcohol and, further, ketone having a relatively higher melting point as disclosed in U.S. Pat. No. 4,659,383 (Japanese Laid-open Patent Publication No. Sho-61-83268). Further, U.S. Pat. No. 5,350,446 (Japanese Patent Publication No. Hei-2-18710) proposed a hot melt ink containing a solid pigment dispersed in wax having a melting point higher than 65° C., C18 to C24 fatty acid or alcohol.

Further, Japanese Laid-open Patent Publication No. Hei-5-125316 discloses a hot melt ink comprising paraffin wax having a melting point higher than 80° C. and natural wax penetration of not more than 2 at room temperature, a dye dissolving agent having a melting point higher than 80° C. and dye, capable of preventing deterioration of print quality such as blurring due to ink remelting upon fixing the ink by heat or pressure, and capable of preventing offsetting due to deposition on a pressing roll, and improving the resistance to printing friction.

However, in the hot melt inks described above, the purity of the coloring material used is low and insoluble ingredients are mixed in the ink even after preparation and filtration of the ink. If such an ink is used for the printing device, deposition and growing of macro particles insoluble to the molten ink results, triggered by the ink insoluble ingredients, to cause clogging of the printing head and the filter to sometimes bring about printing failure. This is a particularly significant problem in an ink jet printer head having a fine and accurate nozzle.

As the insoluble ingredients in question, there are present, for example, inorganic salts such as Ca, Fe, Si, Na, Cl, Mg, Zn, Ni, K, Al, Ba and Pb, analogous compounds having a molecular weight greater than the coloring material main body, and analogous compounds having terminal groups different from those of the coloring material main body.

Particularly, when such insoluble ingredients are present, the coloring material is less soluble to existent ink vehicles. Great amounts of insoluble ingredients may be present in the coloring material as a result of the preparation method of the coloring material. Accordingly, macro particles are deposited in significant amounts.

SUMMARY OF THE INVENTION

The present invention has been accomplished in order to solve the foregoing problems, and it is one object thereof to provide a hot melt ink optimal to a printing device in which substantially no insoluble macro particles are present in the ink in a molten state of the ink.

The hot melt ink according to the present invention for attaining these and other objects may be used with a hot melt type ink jet recording device in which recording is conducted by heating and melting ink under a temperature higher than room temperatures. The hot melt ink is solid at room temperatures and comprises a wax substance having a melting point at a temperature of from 50° to 150° C. and a coloring material from which insoluble ingredients not soluble in the wax substance are removed.

The insoluble ingredients may be inorganic salts, analogous compounds having a molecular weight greater than that of the coloring material main body, analogous compounds having terminal groups different from those of the coloring material main body, or composite materials thereof.

The insoluble ingredients may be eliminated from the coloring material by dissolving or dispersing the coloring material into an organic solvent, filtering the mixed liquid and extracting coloring material ingredients from the liquid filtrate. The coloring material may be treated by using, for example, any one of alcohols, ketones, esters and ethers as the organic solvent.

DETAILED DESCRIPTION OF PREFERRED EMBODIMENTS

The hot melt ink according to the present invention having the foregoing constitution is an ink which is solid at room temperatures, comprising a wax substance having a melting point at a temperature of from 50° C. to 150° C. and a coloring material substantially free of insoluble ingredients not soluble in the wax substance. By "room temperatures" is meant temperatures within the range of approximately 18° to 25° C. By "substantially free of insoluble ingredients" is meant that any insoluble ingredients present in the coloring material have been removed by a separation technique such as filtering. For example, if the coloring material is observed with a transmission light microscope following filtration, insoluble ingredient particles are scarcely recognized, i.e, present in such insufficient amounts as to be not noticeable.

The wax substance constitutes a main material of the ink and determines ink properties such as thermal characteristic and viscosity, while the coloring material provides an ink composition with a color. Further, since ingredients insoluble to the wax substance are removed from the coloring material, the coloring material completely dissolves in the ink. Accordingly, macro particles insoluble in the ink are not deposited.

In the hot melt ink according to the present invention, the coloring material is substantially free of insoluble ingredients such as inorganic salts, analogous compounds having a number average molecular weight greater than that of the coloring material main body, analogous compounds having terminal groups different from those of the coloring material main body, or composite materials thereof. The inorganic salts are, for example, inorganic salts such as Ca, Fe, Si, Na, Cl, Mg, Zn, Ni, K, Al, Ba and Pb. By "analogous compounds" is meant that the chemical structure of the compounds have a base structure that is similar to and/or identical to the chemical structure of the coloring material in question. In other words, the insoluble ingredient is of a chemical structure quite similar to the chemical structure of the coloring material such as a dye, but differs slightly in that it contains additional components that provide the analogous compound with a higher number average molecular weight and/or different terminal groups, which difference in structure is sufficient to render the analogous compound insoluble in a wax substance to which the compound is added. The analogous compounds may be thought of as undesired by-products produced in the manufacturing of the coloring material. Examples of terminal groups differing from the coloring material chemical structure that may be sufficient to render the compound insoluble in a wax substance that the coloring material is soluble in include hydroxyl groups (OH), methyl groups ($CH_3$) or amino groups ($NH_2$). "Composite materials" refers to any combination of the foregoing insoluble ingredients that are themselves insoluble in the wax substance to which the coloring material is added.

The insoluble ingredients are mainly responsible for the deposition of macro particles in the molten ink. Accordingly, the ink jet recording device using the ink does not experience clogging.

The insoluble ingredients are easily removed from the coloring material by using the organic solvent while utilizing the difference of the solubility parameters of the coloring material and insoluble ingredients relative to the organic solvent. The coloring material is dissolved or dispersed in the organic solvent and the liquid mixture of the coloring material and the organic solvent is filtered. Thus, the insoluble ingredients not soluble in the organic solvent are removed. Then, the coloring ingredients are extracted from the liquid filtrate to obtain a purified coloring material.

The coloring material may be treated with any one of, for example, alcohols, ketones, esters and ethers, which have high solubility to the effective ingredients in the coloring material and are easy to work with. Preferably, the coloring material is treated with alkyl alcohols which have higher solubility to the effective ingredients in the coloring material and are easy to work with.

Most preferably, the coloring material is treated with methanol having high solubility for the coloring material ingredients and capable of easily separating the insoluble ingredients. Thus, a coloring material of high purity can be obtained with no requirement for special handling or treating apparatuses.

The coloring material may be a dye, which is less soluble to the wax substance and to which impurities are highly liable to be mixed in the dye production process. The coloring material is most preferably a dye exhibiting cyan or black colors which are less soluble to the wax substance and to which impurities are liable to be mixed in production process thereof.

According to the hot melt ink of the present invention thus constructed, since the ingredients insoluble to the wax substance of the hot melt ink are removed from the coloring material to be added to the ink, the ink does not cause clogging of the printing head or the filter and can provide stable and satisfactory printing quality as an ink used for an ink jet recording device having fine and accurate nozzles.

The hot melt ink used for an ink jet printer comprises a coloring material from which ingredients insoluble to the ink are removed.

More specifically, the method of removing the ingredients that form macro particles insoluble to the hot melt ink from the coloring material includes a step of treating the coloring material with an organic solvent.

The hot melt ink comprises a wax substance having a melting point of from 50° to 150° C. and a coloring material.

The wax substance having a melting point of from 50° to 150° C. used for the ink is thermally stable. Any one of known waxes can be used with no particular restriction, for example, petroleum wax such as, preferably, paraffin wax or micro crystalline wax, plant wax such as, preferably, candelilla wax, carnauba wax, rice wax or jojoba solid wax, animal wax such as, preferably, beeswax, lanolin or whale wax, mineral wax such as, preferably, montan wax, synthetic hydrocarbon such as, preferably, Fisher-Tropsch wax or polyethylene wax, hydrogenated wax such as, preferably, hardened castor oil or hardened castor oil derivative, modified wax such as, preferably, montan wax derivative, paraffin wax derivative, micro crystalline wax derivative or polyethylene wax derivative, higher fatty acid such as, preferably, behenic acid, stearic acid, palmitic acid, myristic acid or lauric acid, higher alcohol such as, preferably, stearyl alcohol or behenyl alcohol, hydroxystearic acid such as, preferably, 12-hydroxystearic acid or 12-hydroxystearic acid derivative, ketone such as, preferably, stearone or laurone, fatty acid amide such as, preferably, lauric acid amide, stearic acid amide, oleic acid amide, erucic acid amide, ricinoleic acid amide, 12-hydroxystearic acid amide, special fatty acid amide or N-substituted fatty acid amide, amine such as, preferably, dodecyl amine, tetradecyl amine or octadecyl amine, ester such as, preferably, methyl stearate, octadecyl stearate, glycerin fatty acid ester, sorbitan fatty acid ester, propylene glycol fatty acid ester, ethylene glycol fatty acid ester or polyoxyethylene fatty acid ester, or α-olefin maleic acid anhydride copolymer.

The waxes described above may be used alone or in admixture of two or more of them. Further, considering the thermal characteristic of the resultant ink, it is preferred that the wax is contained in the ink within a range of from 20 to 80% by weight of the ink. If the content of the wax is less than 20% by weight, the characteristic of other additives may become predominant, and the melting point of the ink may be increased and may not be fixed or stabilized, so that the ink may not melt sharply at a printing operation temperature of the ink jet printing device. However, this can be avoided if other additives are selected properly and used such that the melting points of them may be substantially equal with the melting point of the wax. If the content exceeds 80% by weight, sufficient melting viscosity may not be obtained with the ink, resulting in less depositing of the ink to print paper.

For the hot melt ink, a resin ingredient for controlling the physical properties of the ink may be added. The resin used functions to provide adhesion to the print paper, control viscosity of the ink, hinder the crystallization of the wax and, further, provide the ink with transparency. Particularly, the hot melt ink shows suitable characteristics upon printing to an OHP (over head projector) sheet.

Further, referring to the molecular weight of the resin, it is preferred that the weight average molecular weight MW of the resin is from 500 to 500,000. This is a preferred range because most resins are in a liquid state at room temperatures if the weight average molecular weight MW is below 500, whereas resins may be hard or have an excessively high melting point if the weight average molecular weight MW exceeds 500,000, and these properties are unsuitable for the hot melt ink. Further, in view of the thermal characteristics of the resultant ink, the weight average molecular weight of the resin is preferably from 600 to 400,000. Particularly, in view of the operation temperature of the printer head used for ink jet recording, the weight average molecular weight is most preferably from 700 to 300,000. The weight average molecular weight MW may be obtained from the result of molecular weight reaction by gel permeation chromatography using a differential refractometer as a detector or by elevated temperature gas chromatography using a thermal conductive meter as a detector.

As the resin, an oil soluble resin, for example, is preferred. As the oil soluble resin, there can be mentioned, for example, olefinic resin such as, preferably, polyethylene resin, polypropylene resin or polyisobutylene resin, vinylic resin such as, preferably, ethylene-vinyl acetate copolymer resin, vinyl chloride-vinyl acetate copolymer resin, vinyl acetate resin or ethylene-vinyl chloride-vinyl acetate resin, acrylic resin such as, preferably, methacrylate ester resin, polyacrylate ester resin, ethylene-ethyl acrylate copolymer resin or ethylene-methacrylic acid copolymer resin, phenolic resin, polyurethane resin, polyamide resin, polyester resin, ketone resin, alkyd resin, rosin resin, hydrogenated rosin resin, petroleum resin, hydrogenated petroleum resin, maleic acid resin, butyral resin, terpene resin, hydrogenated terpene resin or chroman-indene resin.

Further, the polymeric materials described above may be used alone or two or more of them may be used in admixture. Considering the melting viscosity of the resultant ink, the resin is preferably contained within the hot melt ink in a range from 5 to 60% by weight of the ink. If the content is below 5% by weight, sufficient melting viscosity of the ink may not be obtained or transparency may not be obtained. If the content exceeds 60% by weight, the melting viscosity may be excessive and the ink may be considerably soft even at room temperatures. Therefore, letters printed by the ink may be susceptible to abrasion and pressure, and recorded dots may be easily collapsed to cause discoloration or blurring.

For the coloring material, a coloring material purified by an organic solvent is used. As the coloring material, existent organic dyes may be used and, preferably, dyes used for oil ink compositions are suitable. Oil soluble dyes, for example, azo dye, disazo dye, metal complex dye, naphthol dye, anthraquinone dye, indigo dye, carbonium dye, quinon-eimine dye, cyanine dye, quinoline dye, nitro dye, nitroso dye, benzoquinone dye, naphthoquinone dye, xanthene dye, phtharocyanine dye and metallo phtharocyanine dye are more preferred. The dyes may be used in combination.

The coloring material may be contained in the ink by from 0.1 to 10% by weight of the ink and, in view of the color forming property of the ink, preferably from 0.5 to 5% by weight. Further, the coloring material is more preferably contained in the ink from 0.5 to 3% by weight of the ink so as to ensure that the dye does not deposit from the ink as a result of thermal change during operation of the printer.

The organic solvent may be those used, for example, for extraction, dissolution, absorption, cleaning and solubilization in a wide range of uses such as mediums for various kinds of organic chemical reactions, petroleums, oils and fats, perfumes and medical drugs. In the present invention, the organic solvent is utilized for separating the coloring material into color ingredients and ingredients insoluble to the ink ingredients (i.e., the wax substance). The properties of the solvent are specific depending on the solvent molecular structure, and the dissolving power varies depending, for example, on the condition upon forming the solution and on the nature of the solute, so that the selection of the solvent uses may be important.

As the organic solvent that may be used for treating the coloring material are, for example, organic solvents with relatively high polarity such as alcohols, for example methanol, ethanol, 1-butanol, 1-pentanol, 1-propanol, isopropyl alcohol, t-butyl alcohol, ethylene glycol and diethylene glycol, ketones, for example acetone, methyl ethyl ketone and methyl isobutyl ketone, acid esters, for example acetic acid and ethyl acetate, and ethers, for example, isopropyl ether, or organic solvents with relatively low polarity obtained by fractional distillation or the like to petroleum, for example cyclohexane, hexane and pyridine.

Particularly, alkyl alcohols having high dissolving power of the color ingredients in the coloring material and that are easy to work with are preferable as the organic solvent. Among them, methanol is a low molecular weight compound, has general applicability to all coloring materials and is not suitable.

In order to treat about 5 parts by weight of coloring material, for example, about 200 parts by weight of the organic solvent may normally be used, that is, a ratio of about 2.5 to 100. However, if the coloring material is one of which can be dissolved easily to the organic solvent, about 20 parts by weight of the coloring material may be treated with about 200 parts by weight of the organic solvent, that is, a ratio of about 10 to 100.

Because the solubility parameters of the coloring material and insoluble ingredients are known, appropriate solvents can be selected as understood by one of ordinary skill in the art. Further, whether or not the coloring material is soluble in the selected solvent can readily be determined. The insoluble ingredients are easily removed from the coloring material using the organic solvent while utilizing the difference of the solubility parameters of the coloring material and insoluble ingredients relative to the organic solvent.

One method of treating the coloring material is explained below.

At first, the coloring material is dissolved or dispersed in an organic solvent and sufficiently mixed under stirring to prepare a mixed solution. The solvent may be heated as necessary. Then, the mixed liquid is filtered and liquid filtrates and materials remaining on the filter paper are collected. If the effective color ingredients of the coloring material are soluble to the organic solvent, the liquid filtrates are dried by heating to obtain a purified powdery coloring material. Alternatively, if the effective color ingredients of the coloring material are insoluble to the organic solvent, the materials remaining on the filter paper are dried by heating to obtain a purified powdery coloring material.

By the treatment as described above, waxy materials and impurities in the coloring material insoluble to the ink, such as insoluble to the resin ingredients, are eliminated. Particularly, inorganic salts possibly causing deposition of particles are removed.

Further description is to be made by way of the following examples of hot melt inks of the present invention.

EXAMPLE 1

In this example, AMIDE S (stearic acid amide manufactured by Kao Corp.) is used as the waxy material having a melting point of from 50° to 150° C. and NEOPEN BLUE 808 (manufactured by BASF Co.) is used as the coloring material. The composition of the ink used for the example is as shown below.

AMIDE S (stearic acid amide: Kao): 97 parts by weight (melting point of about 94° C.)

NEOPEN BLUE 808 (BASF): 3 parts by weight

The ink may be prepared by the following procedures.

At first, 5 parts by weight of NEOPEN BLUE 808 are dissolved into 200 parts by weight of methanol. Then, the dissolved liquid is filtered under suction using a 0.8 μm PTFE membrane filter (manufactured by Advantech Toyo Co.) Then, the liquid filtrates are collected and heated on a hot plate to 100° C., and methanol is evaporated off to obtain 3 parts by weight of the treated coloring material.

AMIDE S is dissolved under heating at 130° C., to which the treated coloring material described above is added and dissolved under stirring to obtain a colored mixture.

Two to three droplets of the thus prepared colored mixture is placed and melted on a slide glass heated to 120° C., and then a cover glass is placed thereon and urged slightly. As a result of observation by transmission light using a microscope "XF-UNR" manufactured by NIKON CORP., particles are scarcely recognized and, accordingly, NEOPEN BLUE 808 as the coloring material is sufficiently dissolved.

Then, the colored mixture is filtered using a 2 μm mesh filter in a hot filtration device manufactured by Toyo Filter Paper Co. to obtain a final hot melt ink.

The ink in Example 1 obtained as described above can be used suitably as the hot melt ink for an ink jet printer. That is, as a result of discharging the hot melt ink in a state melted by heating such that the ink discharging temperature is 100° to 140° C., printing is possible without causing troubles such as flexion and discharge failure of the jet.

EXAMPLE 2

In this example, NIKKA AMIDE SE (stearyl erucic amide manufactured by Nippon Kasei Chemical Co., Ltd.) is used as the waxy material having a melting point from 50° to 150° C. and NEOPEN YELLOW 075 (manufactured by BASF Co.) is used as the coloring material. The composition of the ink used for the example is as shown below.

NIKKA AMIDE SE (stearyl erucic amide): 97 parts by weight (melting point of about 74° C.)

NEOPEN YELLOW 075 (BASF): 3 parts by weight

The ink may be prepared by the following procedures.

At first, 5 parts by weight of NEOPEN YELLOW 075 are dissolved into 200 parts by weight of methyl isobutyl ketone. Then, the dissolved liquid is filtered under suction using a 0.8 μm PTFE membrane filter (manufactured by Advantech Toyo Co.) Then, the liquid filtrates are collected and heated on a hot plate to 100° C., and methanol is evaporated off to obtain 3 parts by weight of the treated coloring material.

NIKKA AMIDE SE is dissolved under heating at 130° C., to which the treated coloring material described above is added and dissolved under stirring to obtain a colored mixture.

Two to three droplets of the thus prepared colored mixture is placed and melted on a slide glass heated to 120° C., and a cover glass is placed thereon and urged slightly. As a result of observation through transmission light using a microscope "XF-UNR" manufactured by NIKON CORP., particles are scarcely recognized and, accordingly, NEOPEN YELLOW 075 as the coloring material is sufficiently dissolved.

Then, the colored mixture is filtered using a 2 μm mesh filter in a hot filtration device manufactured by Toyo Filter Paper Co. to obtain a final hot melt ink.

The ink in Example 2 obtained as described above may be used suitably as the hot melt ink for an ink jet printer. That is, as a result of discharging the hot melt ink in a state melted by heating such that the ink discharging temperature is 100° to 140° C., printing is possible without causing troubles such as flexion and discharge failure of the jet.

Comparative Example 1

A colored mixture is obtained using the same ink composition and preparation method as in the Example 1 described above except that NEOPEN BLUE 808 that has not been treated with methanol is used as the coloring material.

Since the treatment for the coloring material with the organic solvent is not applied for the hot melt ink in the comparative example, the coloring material is not dissolved satisfactorily, a great amount of not-dissolved solid dye particles are present in the ink and, upon filtration by a hot filtration device manufactured by Toyo Filter Paper Co., filter clogging is caused frequently in the course of filtration. Further, although the ink is discharged using the ink that could barely be filtered, this frequently causes troubles such as flexion and discharge failure of the jet, resulting in a failure to conduct stable printing.

Comparative Example 2

A colored mixture is obtained by using the same ink composition and preparation method as in Example 2 described above, except that NEOPEN YELLOW 075 that has not been treated with methyl isobutyl ketone is used.

Since the coloring material is not treated with the organic solvent for the hot melt ink of the comparative example, the coloring material is not dissolved sufficiently, a great amount of not-dissolved solid dye particles are present in the ink, and filter clogging is caused frequently during filtration by a hot filtration device manufactured by Toyo Filter Paper Co. Further although ink discharge is conducted using the ink that could barely be filtered, this frequently causes troubles such as flexion and discharge failure of the jet, resulting in a failure to attain stable printing.

What is claimed is:

1. A hot melt ink, comprising:
    at least one wax substance having a melting point at a temperature ranging from 50° C. to 150° C.; and
    a coloring material substantially free of insoluble ingredients not soluble in the at least one wax substance, wherein the insoluble ingredients are inorganic salts, analogous compounds having a number average molecular weight greater than that of the coloring material main body, analogous compounds having terminal groups different from those of the coloring material main body, or composite materials thereof.

2. The hot melt ink as claimed in claim 1, wherein insoluble ingredients are removed from the coloring material by:
    dissolving or dispersing the coloring material in an organic solvent to obtain a liquid mixture;
    filtering the liquid mixture; and
    extracting coloring material ingredients from a filter or the filtered liquid mixture.

3. The hot melt ink as claimed in claim 1, wherein the coloring material is dye.

4. The hot melt ink as claimed in claim 3, wherein the dye is a cyan dye or black dye.

5. The hot melt ink as claimed in claim 1, wherein said hot melt ink further comprises at least one resin ingredient.

6. The hot melt ink as claimed in claim 5, wherein a weight average molecular weight of said at least one resin is from 500 to 500,000.

7. The hot melt ink as claimed in claim 5, wherein said resin is contained in the hot melt ink in a range of from 5 to 60 wt % by weight of the hot melt ink.

8. The hot melt ink as claimed in claim 1, wherein the coloring material substantially free of insoluble ingredients is contained in the hot melt ink in a range of from 0.1 to 10% by weight of the hot melt ink.

9. A method for removing insoluble ingredients which are not soluble in a hot melt ink from a coloring material for a hot melt ink comprising:

dissolving or dispersing the coloring material in an organic solvent;

preparing a mixed solution of the coloring material and the organic solvent under stirring;

filtering the mixed solution;

collecting the material containing the coloring material; and drying the material containing the coloring material to obtain a purified powdery coloring material.

10. The method for removing insoluble ingredients from a coloring material as claimed in claim 9, wherein the collecting comprises collecting a liquid filtrate of the filtered mixed solution when said coloring material is soluble in the organic solvent.

11. The method for removing insoluble ingredients from a coloring material as claimed in claim 9, wherein the collecting comprises collecting a material remaining on a filter when said coloring material is insoluble in the organic solvent.

12. The method for removing insoluble ingredients from a coloring material as claimed in claim 9, wherein a range of organic solvent to coloring material in said mixed solution is from 100:2.5 to 100:10.

13. The method for removing insoluble ingredients from a coloring material as claimed in claim 9, wherein the organic solvent is selected from the group consisting of alcohols, ketones, esters and ethers.

14. The method for removing insoluble ingredients from a coloring material as claimed in claim 13, wherein the organic solvent is an alkyl alcohol.

15. The method for removing insoluble ingredients from a coloring material as claimed in claim 14, wherein the alkyl alcohol is methanol.

16. A hot melt ink, comprising:

at least one wax substance having a melting point at a temperature ranging from 50° C. to 150° C.; and a coloring material substantially free of insoluble ingredients not soluble in the at least one wax substance, wherein the insoluble ingredients are removed from the coloring material by dissolving or dispersing the coloring material in an inorganic solvent to obtain a liquid mixture, filtering the liquid mixture, and extracting coloring material ingredients from a filter or the filtered liquid mixture.

17. The hot melt ink as claimed in claim 16, wherein the coloring material is dye.

18. The hot melt ink as claimed in claim 16, wherein the organic solvent is selected from the group consisting of alcohols, ketones, esters and ethers.

19. The hot melt ink as claimed in claim 18, wherein the organic solvent is an alkyl alcohol.

20. The hot melt ink as claimed in claim 18, wherein the alkyl alcohol is methanol.

* * * * *